(12) United States Patent
Miyake

(10) Patent No.: US 8,955,333 B2
(45) Date of Patent: Feb. 17, 2015

(54) HEAT EXCHANGE BULKHEAD

(75) Inventor: Yoshiaki Miyake, Komaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1070 days.

(21) Appl. No.: 13/002,091

(22) PCT Filed: Aug. 20, 2009

(86) PCT No.: PCT/JP2009/064571
§ 371 (c)(1),
(2), (4) Date: Dec. 30, 2010

(87) PCT Pub. No.: WO2010/021358
PCT Pub. Date: Feb. 25, 2010

(65) Prior Publication Data
US 2011/0108257 A1    May 12, 2011

(30) Foreign Application Priority Data
Aug. 22, 2008   (JP) ................. 2008-214649

(51) Int. Cl.
*F02C 1/00*    (2006.01)
*F02G 3/00*    (2006.01)
(Continued)

(52) U.S. Cl.
CPC ............... *F01D 25/12* (2013.01); *F23R 3/005* (2013.01); *F23R 2900/03043* (2013.01); *F23R 2900/03045* (2013.01); *Y02T 50/675* (2013.01); *F05D 2260/22141* (2013.01)
USPC ........................................... 60/755; 165/170

(58) Field of Classification Search
CPC .......... F28F 13/12; F28F 3/14; F28D 9/0031; F23R 3/005; F23R 3/002
USPC ......... 60/752–760, 796–800; 165/109.1, 170, 165/181
See application file for complete search history.

(56) References Cited

U.S. PATENT DOCUMENTS 5,763,950 A   6/1998  Fujisaki et al.
5,802,841 A   9/1998  Maeda
(Continued)

FOREIGN PATENT DOCUMENTS

EP    1 628 076 A1   2/2006
JP    7-45762         2/1995
(Continued)

OTHER PUBLICATIONS

Japanese Office Action issued Oct. 30, 2012 in corresponding Japanese Patent Application No. 2010-525704 with English translation.
(Continued)

*Primary Examiner* — Phutthiwat Wongwian
*Assistant Examiner* — William Breazeal
(74) *Attorney, Agent, or Firm* — Wenderoth, Lind & Ponack, LLP.

(57) ABSTRACT

A base plate is more effectively cooled, and the efficiency of cooling the base plate is further improved. In a heat exchange bulkhead 1 that includes a base plate 20 and a plurality of pin-fins 21 provided upright on the surface 20a of the base plate 20, a cooling medium 18 flows in the length direction of the base plate 20 along the surface 20a of the base plate 20, and each of the pin-fins 21 is entirely or partially inclined backward to the downstream side such that the top face thereof is located at the downstream side of the bottom face thereof.

18 Claims, 15 Drawing Sheets

(51) Int. Cl.
*F28F 3/14* (2006.01)
*F01D 25/12* (2006.01)
*F23R 3/00* (2006.01)

(56) References Cited

U.S. PATENT DOCUMENTS

| | | | |
|---|---|---|---|
| 7,694,522 B2 * | 4/2010 | Nakae et al. | 60/752 |
| 2003/0129338 A1 | 7/2003 | Cairo | |
| 2005/0047932 A1 | 3/2005 | Nakae et al. | |
| 2005/0252644 A1 | 11/2005 | Hofmann | |
| 2008/0115498 A1 * | 5/2008 | Patel et al. | 60/752 |
| 2009/0126903 A1 * | 5/2009 | Kuibira et al. | 165/67 |

FOREIGN PATENT DOCUMENTS

| | | |
|---|---|---|
| JP | 2000-320837 | 11/2000 |
| JP | 2001-135755 | 5/2001 |
| JP | 2002-141164 | 5/2002 |
| JP | 2005-45027 | 2/2005 |
| JP | 2005-061725 | 3/2005 |
| JP | 4084264 | 3/2005 |
| RU | 2 039 921 | 7/1995 |
| RU | 43954 | 2/2005 |

OTHER PUBLICATIONS

Decision on Patent Grant issued Apr. 16, 2012 in corresponding Russian Patent Application No. 2011100880/06(001132) with English translation.

Japanese Decision of Final Rejection issued Jul. 2, 2013 in corresponding Japanese Patent Application No. 2010-525704 with partial English translation.

Canadian Decision to Grant a Patent issued Dec. 3, 2013 in corresponding Canadian Patent Application No. 2,731,373 with explanation of relevance.

International Search Report issued Sep. 15, 2009 in International (PCT) Application No. PCT/JP2009/064571.

Yutaka Oda et al., "Numerical and Experimental Studies of Turbulent Heat Transfer in Inclined Pin-Fin Channels with a Wavy Endwall", Proceedings of the 14$^{th}$ International Heat Transfer Conference, IHTC14, Aug. 8-13, 2010, Washington, DC, USA, pp. 1-8.

Yutaka Oda et al., "Large Eddy Simulations of Turbulent Heat Transfer in the Inclined Pin-Fin Channel with a Wavy Endwall", May 2010, with Abstract.

Hideki Moriai et al., "Heat Transfer Characteristics of Inclined Pin-Fin Channels with a Wavy Endwall", Draft No. 110, 2010.

Yusuke Motoda et al., "A Study on Heat Transfer Characteristics of Angled Pin Fins with Wavy Endwall", Mar. 2010, w/partial translation.

Yusuke Motoda et al., "A Study on the Effect of Angled Pin Fins on Endwall Heat Transfer", Proceedings of the International Conference on Power Engineering-09 (ICOPE-09) Nov. 16-20, 2009, Kobe, Japan.

Yoshiaki Miyake et al., "Heat Transfer Characteristics of Pin-Fin Arrays with Ribs to Cool Combustor Liners", Proceedings of the 2$^{nd}$ International Forum on Heat Transfer, Sep. 17-19, 2008, Tokyo, Japan.

Yusuke Motoda et al., "Heat Transfer Characteristics of Channels with Pin-Fins Mounted in Inclined Angles", Jun. 2009, with Abstract.

Yoshiaki Miyake et al., "On the Heat Transfer Enhancement of Pin-Fin Channels by Rib Inserts", May 2008, with Abstract.

Japanese Decision to Grant a Patent issued Jan. 7, 2014 in corresponding Japanese Patent Application No. 2010-525704 with explanation of relevance.

Extended European Search Report issued Jul. 7, 2014 in corresponding European Application No. 09808294.4.

* cited by examiner

FIG. 14

| PIN-FIN DIAMETER | $d$ | 9.0mm |
|---|---|---|
| INCLINATION | $\theta$ | −45 or +45 |
| PITCH IN DIRECTION PERPENDICULAR TO FLOW DIRECTION | $P_1$ | 17.8mm |
| PITCH IN FLOW DIRECTION | $P_2$ | 21.8mm |
| FLOW PASSAGE WIDTH | $W$ | 35.6mm |
| NUMBER OF ROWS | — | 7 |
| REYNOLDS NUMBER | $Re$ | 10000, 5000, 2500, 1000 |

FIG. 15

| Re | | 90° | −45° FLAT SURFACE | +45° FLAT SURFACE | −45° WAVE SURFACE | +45° WAVE SURFACE |
|---|---|---|---|---|---|---|
| 10,000 | [Pa/m] | −11800 | −6360 | −5940 | −6360 | −5640 |
| | [Pa/row] | −217 | −150 | −140 | −150 | −133 |
| 5,000 | [Pa/m] | −4090 | −2300 | −2120 | −2120 | −1820 |
| | [Pa/row] | −75 | −54.3 | −50.0 | −50.0 | −42.9 |
| 2,500 | [Pa/m] | −2270 | −848 | −788 | −788 | −788 |
| | [Pa/row] | −41.7 | −20.0 | −18.6 | −18.6 | −18.6 |
| 1,000 | [Pa/m] | 0 | 0 | 0 | 0 | 0 |
| | [Pa/row] | 0 | 0 | 0 | 0 | 0 |

※VERY SMALL AND UNMEASURABLE WHEN Re IS 1000

HEAT EXCHANGE BULKHEAD

TECHNICAL FIELD

The present invention relates to a structure of a bulkhead for heat exchange and, in particular, to a heat exchange bulkhead suitable for cooling a combustor of a gas turbine.

BACKGROUND ART

Known examples of a heat exchange bulkhead suitable for cooling the combustor of the gas turbine are disclosed in Patent Citations 1 and 2.
Patent Citation 1:
Japanese Unexamined Patent Application, Publication No. 2005-61725
Patent Citation 2:
Publication of Japanese Patent No. 4084264

DISCLOSURE OF INVENTION

In heat exchange bulkheads disclosed in Patent Citations 1 and 2, part of cooling air flowing in the vicinity of the surface of a base plate along the surface of the base plate is disturbed by colliding with ribs provided upright on the surface of the base plate to produce a turbulent flow, and this turbulent flow removes heat from the root portions of fins or round pins provided upright on the surface of the base plate and from the surface of the base plate, thus cooling the root portions of the fins or round pins and the surface of the base plate.

However, the base plate is generally made of a heat-resistant alloy (for example, nickel based) that has excellent heat resistance but low thermal conductivity, and thus, a technology for more effectively cooling the base plate to further improve the efficiency of cooling the base plate is required.

The present invention has been made in view of the above-described circumstances, and an object thereof is to provide a heat exchange bulkhead capable of more effectively cooling the base plate to further improve the efficiency of cooling the base plate.

In order to solve the above-described problem, the present invention employs the following solutions.

According to the present invention, there is provided a heat exchange bulkhead including: a base plate; and a plurality of pin-fins provided upright on a surface of the base plate, a cooling medium flowing in the length direction of the base plate along the surface of the base plate, in which each of the pin-fins is entirely or partially inclined backward to a downstream side such that a top face thereof is located at the downstream side of a bottom face thereof.

According to the heat exchange bulkhead of the present invention, each of the pin-fins is entirely or partially inclined backward such that the top face of the pin-fin is located at the downstream side of the bottom face thereof; thus, the cooling medium passing between the pin-fins arranged in the width direction collides with the surface of the base plate at an angle from the upstream side to efficiently remove heat from the surface of the base plate. Therefore, it is possible to more effectively cool the surface of the base plate and to further improve the efficiency of cooling the base plate.

In the above-described heat exchange bulkhead, it is more preferable that the surface of the base plate have a concave-convex surface having a wave shape in cross section in which a concave portion and a convex portion are alternately formed repeatedly along the length direction of the base plate; and each of the pin-fins be formed to have the bottom face on a downstream-side inclined surface that widens from the apex of the convex portion toward the downstream side.

According to this heat exchange bulkhead, the surface of the base plate has the concave-convex surface having a wave shape in cross section in which the concave portion and the convex portion are alternately formed repeatedly along the length direction of the base plate, and each of the pin-fins is formed such that the bottom face thereof starts from the apex of the convex portion or from slightly downstream of the apex of the convex portion; thus, a cooling medium passing between the pin-fins arranged in the width direction flows in the vicinity of the surface of the base plate along the downstream-side inclined surface, which widens from the apex of the convex portion toward the downstream side, and then collides with an upstream-side inclined surface that widens from the apex of the convex portion toward the upstream side, at a larger angle, to more efficiently remove heat from the surface of the base plate. Therefore, it is possible to more effectively cool the surface of the base plate and to further improve the efficiency of cooling the base plate.

According to the present invention, there is provided a heat exchange bulkhead including: a base plate; and a plurality of pin-fins provided upright on a surface of the base plate, a cooling medium flowing in the length direction of the base plate along the surface of the base plate, in which: each of the pin-fins is entirely or partially inclined forward to an upstream side such that a top face thereof is located at the upstream side of a bottom face thereof; the surface of the base plate has a concave-convex surface having a wave shape in cross section in which a concave portion and a convex portion are alternately formed repeatedly along the length direction of the base plate; and each of the pin-fins is formed to have the bottom face on an upstream-side inclined surface that widens from the apex of the convex portion toward the upstream side.

According to the heat exchange bulkhead of the present invention, each of the pin-fins is entirely or partially inclined forward such that the top face of the pin-fin is located at the upstream side of the bottom face thereof; thus, a cooling medium passing between the pin-fins arranged in the width direction collides with the surface of the base plate at an angle from the upstream side, to efficiently remove heat from the surface of the base plate. Therefore, it is possible to more effectively cool the surface of the base plate and to further improve the efficiency of cooling the base plate.

Further, according to the heat exchange bulkhead of the present invention, the surface of the base plate has the concave-convex surface having a wave shape in cross section in which the concave portion and the convex portion are alternately formed repeatedly along the length direction of the base plate, and each of the pin-fins is formed such that the bottom face thereof starts from the apex of the convex portion or from slightly upstream of the apex of the convex portion; thus, a cooling medium passing between the pin-fins arranged in the width direction flows in the vicinity of the surface of the base plate along the downstream-side inclined surface, which widens from the apex of the convex portion toward the downstream side, and then collides with the upstream-side inclined surface, which widens from the apex of the convex portion toward the upstream side, at a larger angle, to more efficiently remove heat from the surface of the base plate. Therefore, it is possible to more effectively cool the surface of the base plate and to further improve the efficiency of cooling the base plate.

In the above-described heat exchange bulkhead, it is more preferable that a plurality of turbulence enhancing members that disturb the cooling medium flowing in the vicinity of the surface of the base plate to produce a turbulent flow be provided on the surface of the base plate.

According to this heat exchange bulkhead, a cooling medium flowing in the vicinity of the surface of the base plate along the surface of the base plate is disturbed by colliding with the turbulence enhancing members to produce a turbulent flow, and this turbulent flow removes heat more efficiently from the root portions of the pin-fins and from the surface of the base plate. Therefore, it is possible to more effectively cool the root portions of the pin-fins and the surface of the base plate, further improving the efficiency of cooling the base plate.

According to the present invention, there is provided a gas turbine combustor including a heat exchange bulkhead having superior cooling efficiency.

According to the gas turbine combustor of the present invention, heat-exchange efficiency is improved; thus, compared with a conventional gas turbine combustor, it is possible to reduce the amount of a cooling medium required to exchange the same amount of heat.

Therefore, when combustion air is utilized as the cooling medium, it is possible to guide more combustion air to the inside of the combustion chamber, to increase the flow volume of combustion air with respect to the flow volume of fuel, and to reduce the NOx concentration in exhaust gas discharged from the gas turbine combustor by reducing the combustion temperature and by accelerating uniform agitation of combustion gas and non-combustion gas in the combustor to rapidly and uniformly cool them.

According to the present invention, there is provided a gas turbine including a gas turbine combustor having superior heat-exchange efficiency.

According to the gas turbine of the present invention, the heat-exchange efficiency is improved; thus, compared with a conventional gas turbine, it is possible to reduce the amount of a cooling medium required to exchange the same amount of heat.

Therefore, when combustion air is utilized as the cooling medium, it is possible to guide more combustion air to the inside of the combustion chamber, to increase the flow volume of combustion air with respect to the flow volume of fuel, and to reduce the NOx concentration in exhaust gas discharged from the gas turbine.

According to the present invention, an advantage is afforded in that it is possible to cool the base plate more effectively, further improving the efficiency of cooling the base plate.

BRIEF DESCRIPTION OF DRAWINGS

FIG. 14 is a diagram showing the conditions of an experiment conducted using a naphthalene sublimation method in order to verify the effects of the heat exchange bulkheads of the present invention.

FIG. 15 is a diagram showing results of the experiment conducted under the conditions shown in FIG. 14, by using the naphthalene sublimation method in order to verify the effects of the heat exchange bulkheads of the present invention.

EXPLANATION OF REFERENCE

Figure 1:
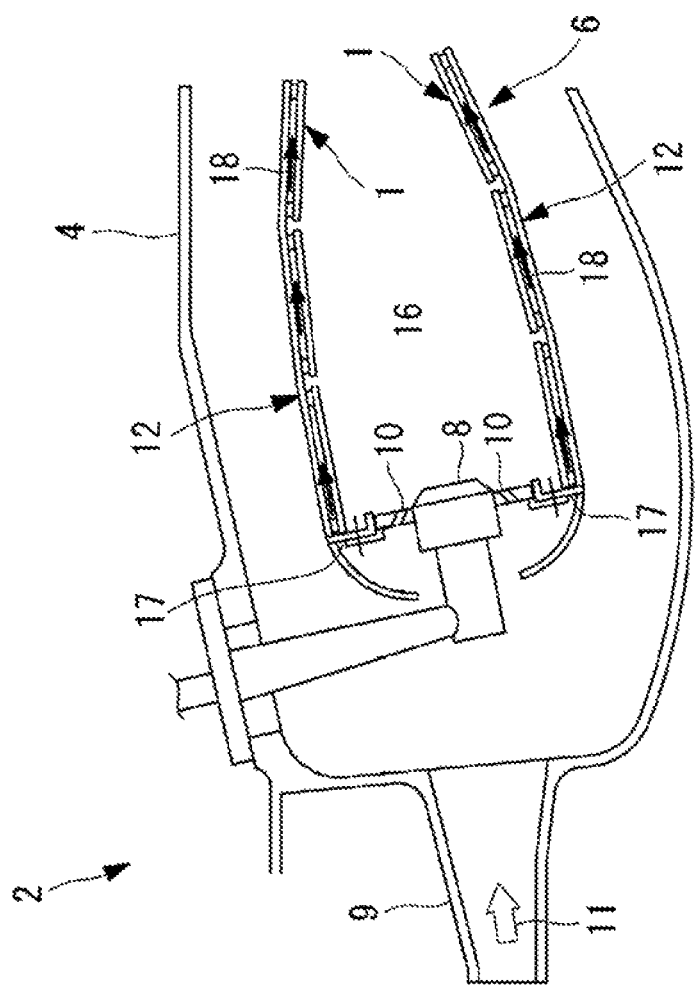
FIG. 1 is a view showing the configuration of a combustor provided with a heat exchange bulkhead according to the present invention.

1: heat exchange bulkhead
2: combustor (gas turbine combustor)
18: cooling air (cooling medium)
20: base plate
20a: surface
21: pin-fin
25: heat exchange bulkhead
26: base plate 26a: surface
27: concave portion
28: convex portion
28a: downstream-side inclined surface
28b: upstream-side inclined surface
31: heat exchange bulkhead
32: rib (turbulence enhancing member)
33: base plate
35: heat exchange bulkhead
36: pin-fin
40: pin-fin

BEST MODE FOR CARRYING OUT THE INVENTION

A heat exchange bulkhead according to a first embodiment of the present invention will be described below with reference to FIGS. 1 to 3.

FIG. 1 is a view showing the configuration of a combustor provided with the heat exchange bulkhead according to the present invention. FIG. 2 is a sectional view of the heat exchange bulkhead according to this embodiment in a plane along the longitudinal direction thereof and perpendicular to the surface thereof. FIG. 3 is a view for explaining the arrangement state of pin-fins provided upright on the heat exchange bulkhead shown in FIG. 2, in a plane orthogonal to the central axes of the pin-fins.

A heat exchange bulkhead 1 according to this embodiment can be applied, for example, to a combustor 2 in an aircraft gas turbine (not shown) that includes, as main components, a compressor (not shown) that compresses combustion air, the combustor (gas turbine combustor) 2 that injects fuel into high-pressure air sent from the compressor to combust to produce high-temperature combustion gas, and a turbine (not shown) that is located at the downstream side of the combustor 2 and is driven by the combustion gas output from the combustor 2.

As shown in FIG. 1, the combustor 2 includes an external cylinder 4 and an internal cylinder 6. The external cylinder 4 is provided with an air inlet 9 for taking in compressed air 11 discharged from the compressor.

On the other hand, an outer wall of the internal cylinder 6 is formed of a shell 12. The internal cylinder 6 is provided with a fuel nozzle 8 that injects fuel into the inside of the internal cylinder 6 and an air inlet 10 that guides air to the inside of the internal cylinder 6.

The inner side of the shell 12 is covered with a plurality of heat exchange bulkheads (also called "panels") 1. A space surrounded by the heat exchange bulkheads 1 forms a combustion chamber 16 in which fuel gas and air are mixed and combusted. The heat exchange bulkheads 1 are attached to the shell 12 so as to have a gap with respect to the shell 12. The gap between the heat exchange bulkheads 1 and the shell 12 is communicated with a cooling-air inlet 17 into which the compressed air 11 flows or with cooling-air holes (not shown) provided in the shell 12. The downstream side of the combustion chamber 16 is connected to an inlet of the turbine.

Note that reference numeral 18 in FIG. 1 denotes cooling air (cooling medium) flowing through the gap between the heat exchange bulkheads 1 and the shell 12.

Figure 2:
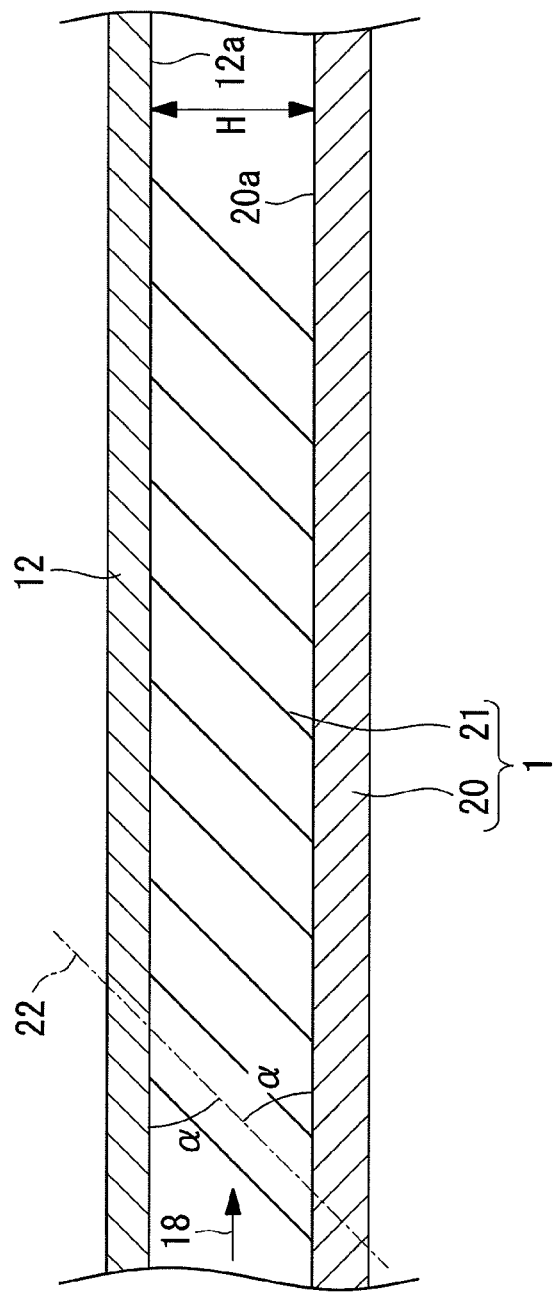
FIG. 2 is a sectional view of a heat exchange bulkhead according to a first embodiment of the present invention, in a plane along the longitudinal direction thereof and perpendicular to the surface thereof.

As shown in FIG. 2, each of the heat exchange bulkheads 1 according to this embodiment includes a base plate 20 and a plurality of pin-fins 21 that are regularly provided upright (disposed) on a flat (no asperities) surface 20a of the base plate 20.

Each of the pin-fins 21 is a cylindrical member that has a bottom face on the surface 20a of the base plate 20 and that has a circular shape (or an elliptical shape) in cross section in a plane orthogonal to a straight line 22 indicating the central axis (longitudinal axis) thereof (in other words, that has an elliptical shape in cross section in a plane parallel to the surface 20a of the base plate 20). Each pin-fin 21 is formed such that a height H thereof in a direction perpendicular to the surface 12a of the shell 12 is equal to or slightly shorter than the distance between the surface 20a of the base plate 20 and the surface 12a of the shell 12 (more specifically, such that the height H is equal to approximately four times the radius of the pin-fin 21).

Further, each pin-fin 21 is provided upright on the surface 20a of the base plate 20 at a backward-inclination angle (angle between the straight line 22 and the surface 20a of the base plate 20 or angle between the straight line 22 and the surface 12a of the shell 12) a (45 degrees in this embodiment) such that the top face thereof (face that faces the surface 12a of the shell 12) is located at a downstream side (right side in FIG. 3) of the bottom face thereof to provide backward inclination.

Figure 3:
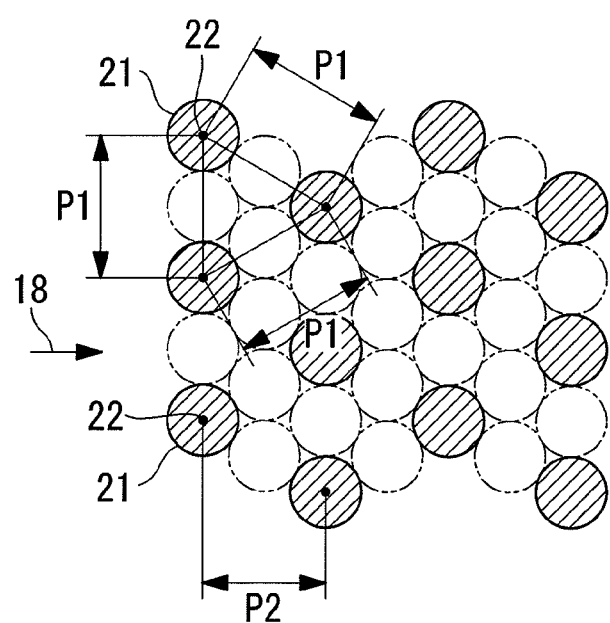
FIG. 3 is a view for explaining the arrangement state of pin-fins provided upright on the heat exchange bulkhead shown in FIG. 2, in a plane orthogonal to the central axes of the pin-fins.

As shown in FIG. 3, when the pin-fins 21 are viewed in a plane orthogonal to the straight lines 22 indicating their central axes, the pin-fins 21 are arranged such that the distance between the centers of adjacent pin-fins 21 is always equal to a pitch P1 (equal to "4" if the radii of the pin-fins 21 are "1"), specifically, straight lines connecting the centers of adjacent pin-fins 21 form an equilateral triangle. In other words, when the pin-fins 21 are viewed in a plane orthogonal to the straight lines 22 indicating their central axes, the pin-fins 21 are periodically arranged at equal intervals (pitch P1=4) in the width direction (transverse direction, i.e., vertical direction in FIG. 3) and are periodically arranged at equal intervals (pitch P2=3.464) in the length direction (longitudinal direction, i.e., horizontal direction in FIG. 3).

Next, the effects of the heat exchange bulkhead 1 according to this embodiment will be described.

When cooling air 18 flowing through the gap between the surface 12a of the shell 12 and the surface 20a of the base plate 20 passes between the pin-fins 21 arranged in the width direction, the flow passage area thereof is narrowed down to ½ (if the height H is equal to the distance between the surface 20a of the base plate 20 and the surface 12a of the shell 12), and thus, the flow velocity thereof becomes double. Also, the cooling air 18 flows in the direction of the resultant force of a component in the direction along the straight line 22, which indicates the central axis of the pin-fin 21, and a component in the direction orthogonal to that component, specifically, the cooling air 18 flows in a direction in which it collides with the surface 20a of the base plate 20 at an angle from the upstream side (see FIG. 9, for example).

Thus, heat is efficiently removed from the surface 20a of the base plate 20, and therefore, it is possible to more effectively cool the surface 20a of the base plate 20 and to further improve the efficiency of cooling the base plate 20.

Note that part of the cooling air 18 flowing in the vicinity of the surface 20a of the base plate 20 along the surface 20a of the base plate 20 passes through a dead water region that is formed in the vicinity of a rear face (downstream-side face located at the right side in FIG. 2) of the pin-fin 21, is guided toward the shell 12, and flows downstream along the surface 12a of the shell 12.

Then, the cooling air 18 flowing downstream along the surface 12a of the shell 12 collides with the surface 20a of the base plate 20 again.

According to the heat exchange bulkhead 1 of this embodiment, the pin-fin 21 is entirely inclined backward such that the top face of the pin-fin 21 is located at the downstream side of the bottom face thereof; thus, the cooling air 18 passing between the pin-fins 21 arranged in the width direction collides with the surface 20a of the base plate 20 at an angle from the upstream side to efficiently remove heat from the surface 20a of the base plate 20. Therefore, it is possible to more effectively cool the surface 20a of the base plate 20 and to further improve the efficiency of cooling the base plate 20.

Figure 4:
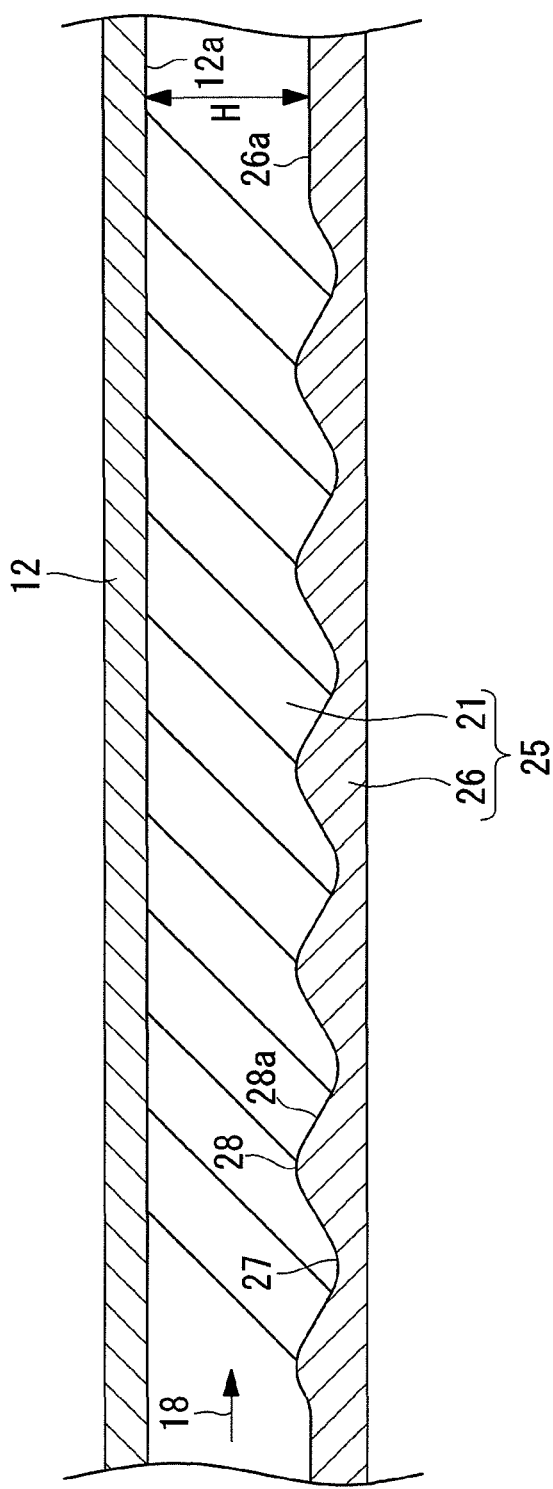
FIG. 4 is a sectional view of a heat exchange bulkhead according to a second embodiment of the present invention, in a plane along the longitudinal direction thereof and perpendicular to the surface thereof.

A heat exchange bulkhead according to a second embodiment of the present invention will be described with reference to FIG. 4. FIG. 4 is a sectional view of the heat exchange bulkhead according to this embodiment in a plane along the longitudinal direction thereof and perpendicular to the surface thereof. As shown in FIG. 4, a heat exchange bulkhead 25 of this embodiment differs from that of the above-described first embodiment in that a base plate 26 is provided instead of the base plate 20. Since the other components are the same as those of the above-described first embodiment, a description of the components will be omitted here.

A surface 26a of the base plate 26 has a concave-convex surface having a wave shape in cross section in which a concave portion 27 and a convex portion 28 are alternately formed repeatedly along the length direction (the horizontal direction in FIG. 4) of the base plate 26 (that is, the heat exchange bulkhead 25). The concave portion 27 and the convex portion 28 extend along the width direction (the direction perpendicular to the plane of the paper of FIG. 4).

Further, each of the pin-fins 21 has a bottom face on a downstream-side inclined surface 28a that widens (extends) from the apex of the convex portion 28 toward the downstream side. Specifically, each pin-fin 21 is formed such that the bottom face thereof starts from the apex of the convex portion 28 or from slightly downstream of the apex of the convex portion 28.

Figure 5:
FIG. 5 is a diagram showing a CFD calculation result obtained when the clearance is zero and the degree of asperity is 1.
Figure 6:
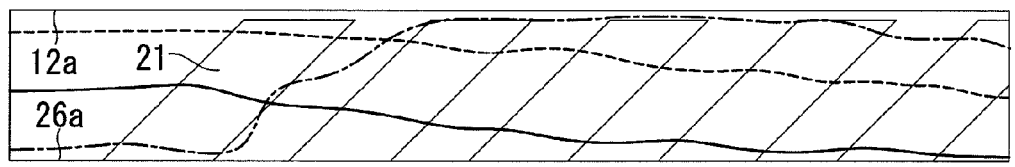
FIG. 6 is a diagram showing a CFD calculation result obtained when the clearance is 0.3 and the degree of asperity is 1.
Figure 7:
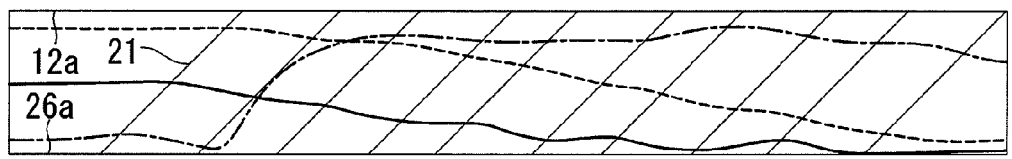
FIG. 7 is a diagram showing a CFD calculation result obtained when the clearance is zero and the degree of asperity is 2.
Figure 8:
FIG. 8 is a diagram showing a CFD calculation result obtained when the clearance is 0.3 and the degree of asperity is 2.

Next, the effects of the heat exchange bulkhead 25 of this embodiment will be described using FIGS. 5 to 8. FIGS. 5 to 8 are diagrams all showing CFD calculation results: FIG. 5 shows a calculation result obtained when a clearance (gap between the surface 12a of the shell 12 and the top face of the pin-fin 21) is zero and the degree of asperity (the degree of asperity on the surface 26a of the base plate 26) is 1; FIG. 6 shows a calculation result obtained when the clearance is 0.3 (0.3 times the radius of the pin-fin 21) and the degree of asperity is 1; FIG. 7 shows a calculation result obtained when the clearance is zero and the degree of asperity is 2; and FIG. 8 shows a calculation result obtained when the clearance is 0.3 and the degree of asperity is 2.

Figure 9:
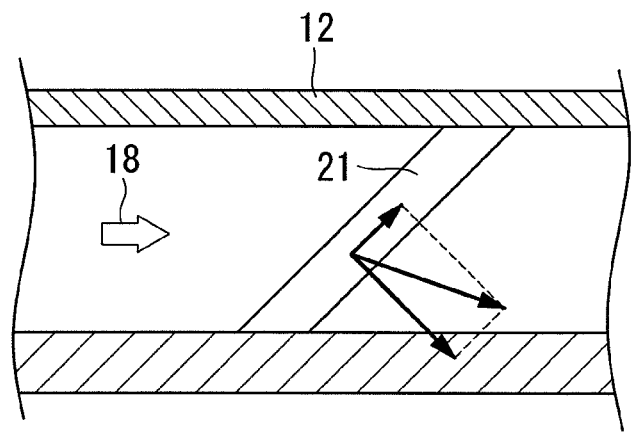
FIG. 9 is a view for explaining a degree of asperity of 1, and is a sectional view of the heat exchange bulkhead in a plane along the longitudinal direction thereof and perpendicular to the surface thereof.

Here, a degree of asperity of 1 indicates that the inclination of the downstream-side inclined surface 28a, which widens from the apex of the convex portion 28 toward the downstream side, is formed so as to be aligned with the direction of the resultant force of the following components, when a component in the direction along the straight line 22 (see FIG. 2), which indicates the central axis of the pin-fin 21, is "1", and a component in the direction orthogonal to that component is "2", as shown in FIG. 9.

Figure 10:
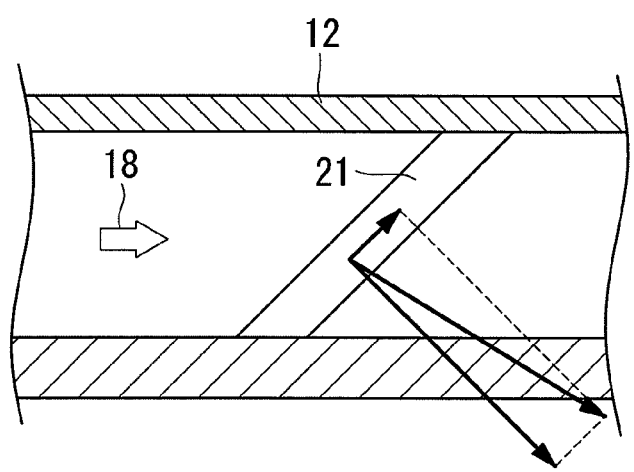
FIG. 10 is a view for explaining a degree of asperity of 2, and is a sectional view of the heat exchange bulkhead in a plane along the longitudinal direction thereof and perpendicular to the surface thereof.

Also, a degree of asperity of 2 indicates that the inclination of the downstream-side inclined surface 28a, which widens from the apex of the convex portion 28 toward the downstream side, is formed so as to be aligned with the direction of the resultant force of the following components, when a component in the direction along the straight line 22 (see FIG. 2), which indicates the central axis of the pin-fin 21, is "1", and a component in the direction orthogonal to that component is "4", as shown in FIG. 10.

When FIGS. 5 and 7 or FIGS. 6 and 8 are compared, it is found that part (indicated by dashed lines in the figures) of the cooling air 18 (see FIG. 4) flowing in the vicinity of the surface 12a of the shell 12 along the surface 12a of the shell 12 and part (indicated by solid lines in the figures) of the cooling air 18 (see FIG. 4) flowing through substantially the center between the surface 12a of the shell 12 and the surface 26a of the base plate 26 along the surface 12a of the shell 12 collide with the surface 26a of the base plate 26 in a shorter distance (specifically, in a shorter time) at a larger angle, as the degree of asperity is larger (specifically, as the inclination of the downstream-side inclined surface 28a is larger).

Note that, in a case where there is no asperity on the surface of the base plate 26, specifically, in the case of the base plate 20 shown in FIG. 2 described in the first embodiment, the part of the cooling air 18 (see FIG. 4) flowing in the vicinity of the surface 12a of the shell 12 along the surface 12a of the shell 12 and the part of the cooling air 18 (see FIG. 4) flowing through substantially the center between the surface 12a of the shell 12 and the surface 20a of the base plate 20 along the surface 12a of the shell 12 collide with the surface 20a of the base plate 20 in a longer distance at a smaller angle, compared with this embodiment.

From those figures, it is also found that part (indicated by alternate long and short dashed lines in the figures) of the cooling air 18 (see FIG. 4) flowing in the vicinity of the surface 26a of the base plate 26 along the surface 26a of the base plate 26 passes through the dead water region formed in vicinity of the rear face (downstream-side face located at the right side in the figures) of the pin-fin 21, is guided to the vicinity of the surface 12a of the shell 12, and flows in the vicinity of the surface 12a of the shell 12 along the surface 12a of the shell 12.

Then, the cooling air 18 (see FIG. 4) flowing in the vicinity of the surface 12a of the shell 12 along the surface 12a of the shell 12 flows as indicated by the dashed lines in the figures and collides with the surface 26a of the base plate 26.

On the other hand, the cooling air 18 (see FIG. 4) colliding with the surface 26a of the base plate 26 flows for a while in the vicinity of the surface 26a of the base plate 26 along the surface 26a of the base plate 26, flows as indicated by the alternate long and short dashed lines in the figures, is guided to the vicinity of the surface 12a of the shell 12, and flows in the vicinity of the surface 12a of the shell 12 along the surface 12a of the shell 12.

According to the heat exchange bulkhead 25 of this embodiment, the surface 26a of the base plate 26 has the concave-convex surface having a wave shape in cross section in which the concave portion 27 and the convex portion 28 are alternately formed repeatedly along the length direction of the base plate 26, and the pin-fin 21 is formed such that the bottom face thereof starts from the apex of the convex portion 28 or from slightly downstream of the apex of the convex portion 28. Thus, the cooling air 18 passing between the pin-fins 21 arranged in the width direction flows in the vicinity of the surface 26a of the base plate 26 along the downstream-side inclined surface 28a, which widens from the apex of the convex portion 28 toward the downstream side, and then collides with an upstream-side inclined surface 28b (see FIG. 11) that widens from the apex of the convex portion 28 toward the upstream side, at a larger angle, to more efficiently remove heat from the surface 26a of the base plate 26. Therefore, it is possible to cool the surface 26a of the base plate 26 more effectively than in the first embodiment and to improve the efficiency of cooling the base plate 26 more than in the first embodiment.

Figure 11:
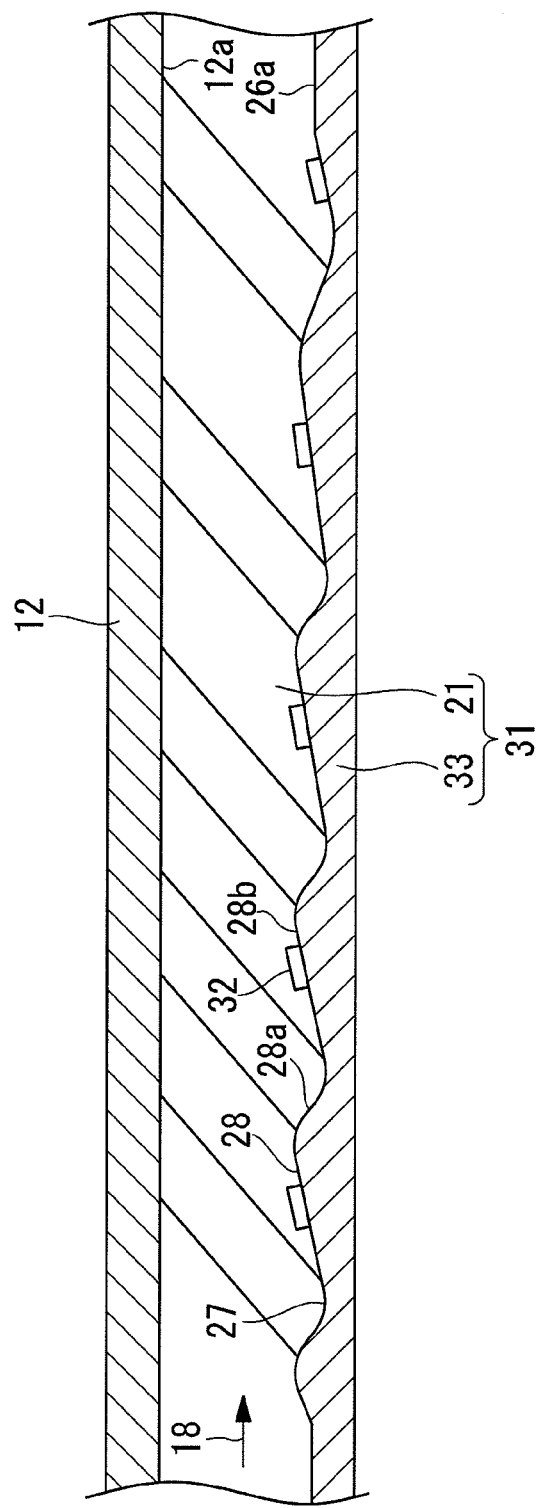
FIG. 11 is a sectional view of a heat exchange bulkhead according to a third embodiment of the present invention, in a plane along the longitudinal direction thereof and perpendicular to the surface thereof.
Figure 12:
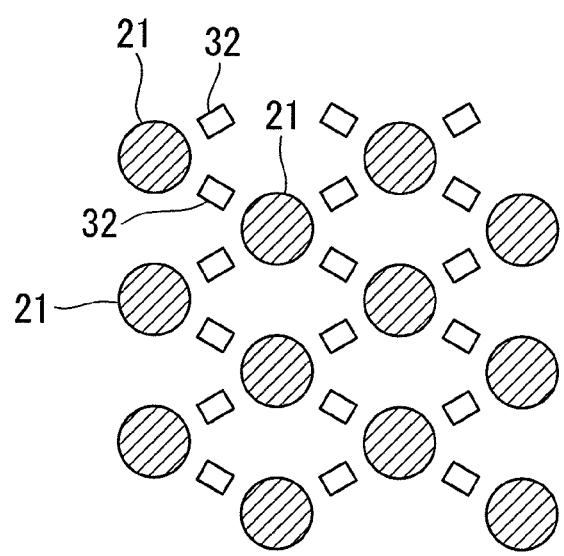
FIG. 12 is a view for explaining the arrangement state of ribs provided upright on the heat exchange bulkhead shown in FIG. 11, when a base plate side is viewed from a shell side.

A heat exchange bulkhead according to a third embodiment of the present invention will be described with reference to FIGS. 11 and 12. FIG. 11 is a sectional view of the heat exchange bulkhead according to this embodiment in a plane along the longitudinal direction thereof and perpendicular to the surface thereof. FIG. 12 is a view for explaining the arrangement state of ribs provided upright on the heat exchange bulkhead shown in FIG. 11, when a base plate side is viewed from a shell side.

As shown in FIGS. 11 and 12, a heat exchange bulkhead 31 according to this embodiment differs from that of the above-described second embodiment in that a base plate 33 in which a plurality of ribs 32 are provided upright on the surface 26a of the base plate 26 is provided. Since the other components are the same as those of the above-described second embodiment, a description of the components will be omitted here.

As shown in FIG. 11 or 12, the ribs (turbulence enhancing members) 32 are formed such that the length-wise axes thereof are located in straight lines connecting the centers of adjacent pin-fins 21, on the upstream-side inclined surface 28b, which widens (extends) from the apex of the convex portion 28 toward the upstream side, specifically, such that they are located in radial lines extending from the center of one pin-fin 21 toward the centers of other adjacent pin-fins 21 disposed at the upstream side and/or the downstream side.

According to the heat exchange bulkhead 31 of this embodiment, part of the cooling air 18 (see FIG. 11) flowing in the vicinity of the surface 26a of the base plate 33 along the surface 26a of the base plate 33 is disturbed by colliding with the ribs 32 to produce a turbulent flow, and this turbulent flow efficiently removes heat from root portions of the pin-fins 21 and the surface 26a of the base plate 33. Therefore, it is possible to more effectively cool the root portions of the pin-fins 21 and the surface 26a of the base plate 33 and to further improve the efficiency of cooling the base plate 33.

Figure 13:
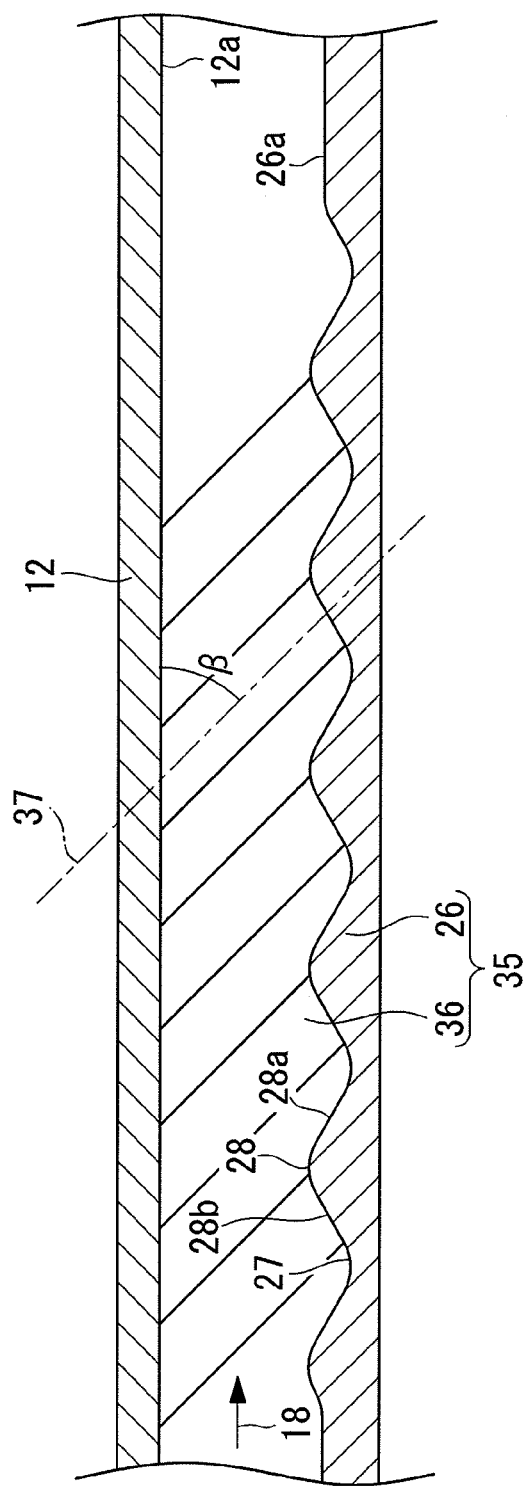
FIG. 13 is a sectional view of a heat exchange bulkhead according to a fourth embodiment of the present invention, in a plane along the longitudinal direction thereof and perpendicular to the surface thereof.

A heat exchange bulkhead according to a fourth embodiment of the present invention will be described with reference to FIG. 13. FIG. 13 is a sectional view of the heat exchange bulkhead according to this embodiment in a plane along the longitudinal direction thereof and perpendicular to the surface thereof.

As shown in FIG. 13, a heat exchange bulkhead 35 of this embodiment differs from that of the above-described second embodiment in that pin-fins 36 are provided instead of the pin-fins 21. Since the other components are the same as those of the above-described second embodiment, a description of the components will be omitted here.

Each of the pin-fins 36 is provided upright on the concave-convex surface of the base plate 26 at a forward-inclination angle (angle between a straight line 37 and the surface 12a of the shell 12 or angle between the straight line 37 and the surface 26a of the base plate 26) β (45 degrees in this embodiment) such that the top face thereof (face that faces the surface 12a of the shell 12) is located at the upstream side (the left side in FIG. 13) of the bottom face thereof to provide forward inclination. Specifically, each of the pin-fins 36 has a bottom face on the upstream-side inclined surface 28b, which widens (extends) from the apex of the convex portion 28 toward the upstream side. In other words, each pin-fin 36 is formed such that the bottom face thereof starts from the apex of the convex portion 28 or from slightly upstream of the apex of the convex portion 28.

Since the effects of the heat exchange bulkhead 35 of this embodiment are the same as those of the above-described second embodiment, a description thereof will be omitted here.

FIGS. 15 to 18 show results of an experiment that is conducted by a naphthalene sublimation method under the conditions shown in FIG. 14, in order to verify (support) the effects of the heat exchange bulkheads of the present invention.

Note that, in FIG. 14, when an inclination θ is equal to −45, it means that pin-fins are provided upright on the surface 20a of the base plate 20 or on the downstream-side inclined surface 28a of the base plate 26 at a backward-inclination angle α of 45 degrees; and, when the inclination θ is equal to +45, it means that pin-fins are provided upright on the surface 20a of the base plate 20 or on the upstream-side inclined surface 28b of the base plate 26 at a forward-inclination angle β of 45 degrees.

FIG. 15 shows that the pressure loss of each of the heat exchange bulkhead 1 (heat exchange bulkhead indicated by "−45°, flat surface" in FIG. 15) described in the first embodiment in which the pin-fins 21 are provided upright on the surface 20a of the base plate 20 at the backward-inclination angle α of 45 degrees; a heat exchange bulkhead (heat exchange bulkhead indicated by "+45°, flat surface" in FIG. 15) in which the pin-fins 21 are provided upright on the surface 20a of the base plate 20 at the forward-inclination angle β of 45 degrees; the heat exchange bulkhead 25 (heat exchange bulkhead indicated by "−45°, wave surface" in FIG. 15) described in the second embodiment in which the pin-fins 21 are provided upright on the downstream-side inclined surface 28a of the base plate 26 at the backward-inclination angle α of 45 degrees; and the heat exchange bulkhead 35 (heat exchange bulkhead indicated by "+45°, wave surface" in FIG. 15) described in the fourth embodiment in which the pin-fins 36 are provided upright on the upstream-side inclined surface 28b of the base plate 26 at the forward-inclination angle β of 45 degrees is about half that of a heat exchange bulkhead (heat exchange bulkhead indicated by "90°" in FIG. 15) in which pin-fins are provided upright on the surface 20a of the base plate 20 at a backward-inclination angle α of 90 degrees (or at a forward-inclination angle β of 90 degrees).

This is because, since the pin-fins 21 are provided upright on the surface 20a of the base plate 20 or on the downstream-side inclined surface 28a of the base plate 26 at the backward-inclination angle α (α=45 degrees in the above-described embodiments and this experiment), or since the pin-fins 36 are provided upright on the surface 20a of the base plate 20 or on the upstream-side inclined surface 28b of the base plate 26 at the forward-inclination angle β (β=45 degrees in the above-described embodiments and this experiment), the density of the pin-fins when they are viewed from the upstream side or the downstream side in the flow direction, that is, the projection area of the pin-fins projected on a plane orthogonal to the surface 12a of the shell 12, is reduced, suppressing a reduction in the flow passage area between the pin-fins. Then, when a reduction in the flow passage area between the pin-fins is suppressed, an increase in the flow velocity of the cooling air 18 passing between the pin-fins is suppressed, thus improving the efficiency of heat exchange between the cooling air 18 and the pin-fins, and efficiently cooling the pin-fins by the cooling air 18.

Figure 16:
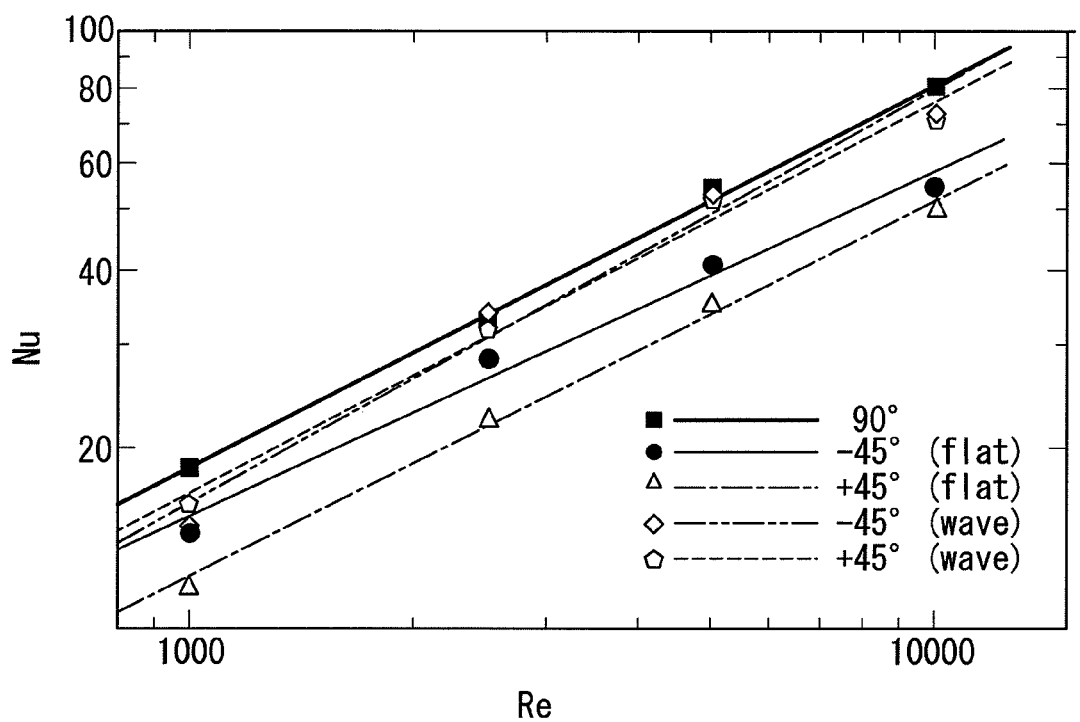
FIG. 16 is a diagram showing results of the experiment conducted under the conditions shown in FIG. 14, by using the naphthalene sublimation method in order to verify the effects of the heat exchange bulkheads of the present invention.

Further, FIG. 16 shows that the heat-transfer coefficient on the concave-convex surface of the base plate 26 in each of the heat exchange bulkhead 25 (heat exchange bulkhead indicated by "−45° (wave)" in FIG. 16) described in the second embodiment, in which the pin-fins 21 are provided upright on the downstream-side inclined surface 28a of the base plate 26 at the backward-inclination angle α of 45 degrees, and the heat exchange bulkhead 35 (heat exchange bulkhead indicated by "+45° (wave)" in FIG. 16) described in the fourth embodiment, in which the pin-fins 36 are provided upright on the upstream-side inclined surface 28b of the base plate 26 at the forward-inclination angle β of 45 degrees is slightly lower than that in the heat exchange bulkhead (heat exchange bulkhead indicated by "90°" in FIG. 16) in which the pin-fins are provided upright on the surface 20a of the base plate 20 at the backward-inclination angle α of 90 degrees (or at the forward-inclination angle β of 90 degrees), but there is not much difference from that in the heat exchange bulkhead in which the pin-fins are provided upright on the surface 20a of the base plate 20 at the backward-inclination angle α of 90 degrees (or at the forward-inclination angle β of 90 degrees).

Figure 17:
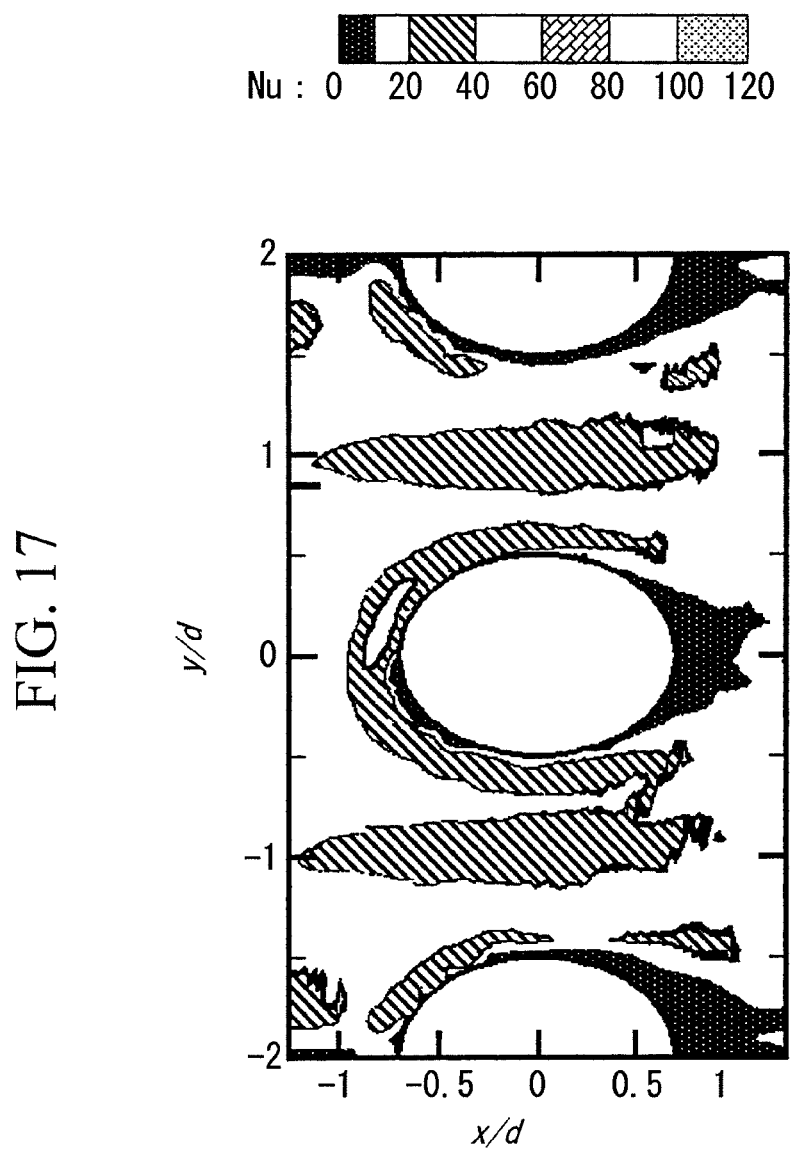
FIG. 17 is a diagram showing results of the experiment conducted under the conditions shown in FIG. 14, by using the naphthalene sublimation method in order to verify the effects of the heat exchange bulkheads of the present invention.

Note that the heat-transfer coefficient on the surface 20a of the base plate 20 in the heat exchange bulkhead 1 (heat exchange bulkhead indicated by "−45° (flat)" in FIG. 16) described in the first embodiment, in which the pin-fins 21 are provided upright on the surface 20a of the base plate 20 at the backward-inclination angle α of 45 degrees, is lower than that in each of the heat exchange bulkhead 25 (heat exchange bulkhead indicated by "−45° (wave)" in FIG. 16) described in the second embodiment, in which the pin-fins 21 are provided upright on the downstream-side inclined surface 28a of the base plate 26 at the backward-inclination angle α of 45 degrees, and the heat exchange bulkhead 35 (heat exchange bulkhead indicated by "+45° (wave)" in FIG. 16) described in the fourth embodiment, in which the pin-fins 36 are provided upright on the upstream-side inclined surface 28b of the base plate 26 at the forward-inclination angle β of 45 degrees. This point is also found by comparing FIG. 17 with FIG. 18: FIG. 17 visualizes the heat-transfer coefficient on the surface 20a of the base plate 20 in the heat exchange bulkhead 1 described in the first embodiment, in which the pin-fins 21 are provided upright on the surface 20a of the base plate 20 at the backward-inclination angle α of 45 degrees; and FIG. 18 visualizes the heat-transfer coefficient on the downstream-side inclined surface 28a of the base plate 26 in the heat exchange bulkhead 25 described in the second embodiment, in which the pin-fins 21 are provided upright on the downstream-side inclined surface 28a of the base plate 26 at the backward-inclination angle α of 45 degrees. However, as described above, when the pin-fins 21 are provided upright on the surface 20a of the base plate 20 at the backward-inclination angle α of 45 degrees, the density of the pin-fins 21 when they are viewed from the upstream side or the downstream side in the flow direction, that is, the projection area of the pin-fins 21 projected on a plane orthogonal to the surface 12a of the shell 12, is reduced, suppressing a reduction in the flow passage area between the pin-fins 21. Then, when a reduction in the flow passage area between the pin-fins 21 is suppressed, an increase in the flow velocity of the cooling air 18 passing between the pin-fins 21 is suppressed, thus improving the efficiency of heat exchange between the cooling air 18 and the pin-fins 21, and efficiently cooling the pin-fins 21 by the cooling air 18. As a result, in the heat exchange bulkhead 1, in which the pin-fins 21 are provided upright on the surface 20a of the base plate 20 at the backward-inclination angle α of 45 degrees, the reduction in the heat-transfer coefficient shown in FIG. 16 is compensated for.

Figure 18:
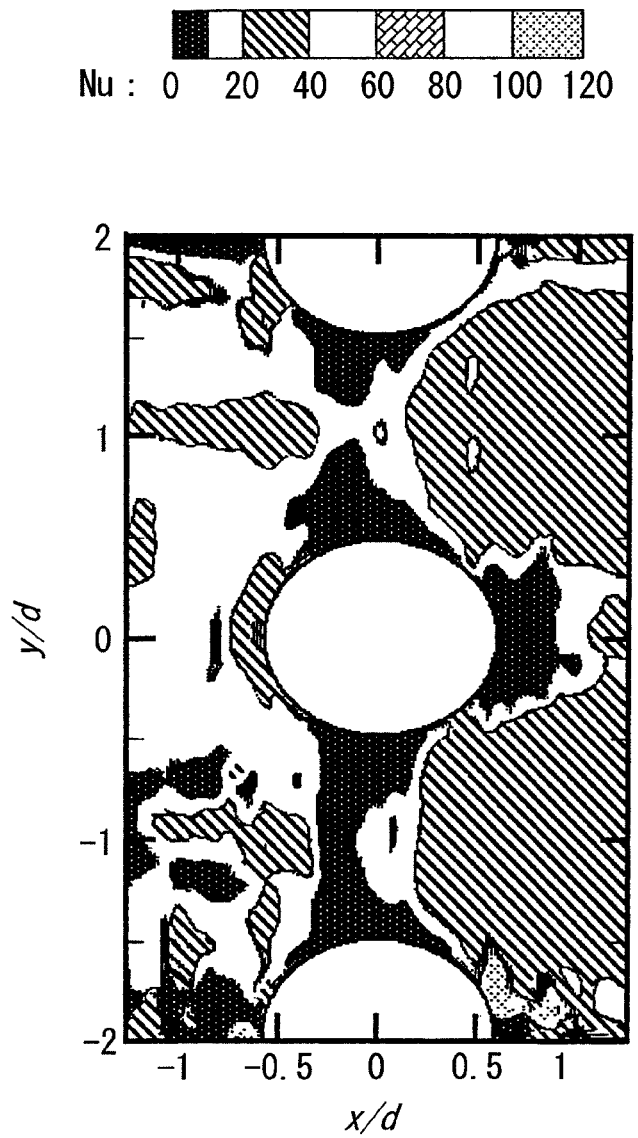
FIG. 18 is a diagram showing results of the experiment conducted under the conditions shown in FIG. 14, by using the naphthalene sublimation method in order to verify the effects of the heat exchange bulkheads of the present invention.

Further, "Nu" shown in FIGS. 16 to 18 is a dimensionless number (Nusselt number) specifying the intensity of heat transfer between the cooling air (fluid) 18 and the base plate (20 or 26).

According to the combustor 2 having the above-described heat exchange bulkhead 1, 25, 31, or 35, the heat exchange bulkhead having superior cooling efficiency is included to enhance the heat-exchange efficiency; therefore, compared with a conventional combustor, it is possible to reduce the amount of cooling air required to exchange the same amount of heat, to guide more combustion air to the inside of the combustion chamber 16, to increase the flow volume of combustion air with respect to the flow volume of fuel, and to reduce the NOx concentration in exhaust gas discharged from the combustor 2.

Furthermore, according to the aircraft gas turbine having this combustor 2, because the gas turbine combustor having superior heat-exchange efficiency is included, compared with a conventional gas turbine, it is possible to reduce the amount of cooling air required to exchange the same amount of heat, to guide more combustion air to the inside of the combustion chamber 16, to increase the flow volume of combustion air with respect to the flow volume of fuel, and to reduce the NOx concentration in exhaust gas discharged from the aircraft gas turbine by reducing the combustion temperature and by accelerating uniform agitation of combustion gas and non-combustion gas in the combustor to rapidly and uniformly cool them.

Note that the pin-fin 21 of the present invention is not limited to one having a circular shape (or an elliptical shape) in cross section in a plane orthogonal to the straight line 22 (see FIG. 2), which indicates the central axis thereof; it may have any shape, such as a polygonal shape and a semicircular shape.

Figure 19:
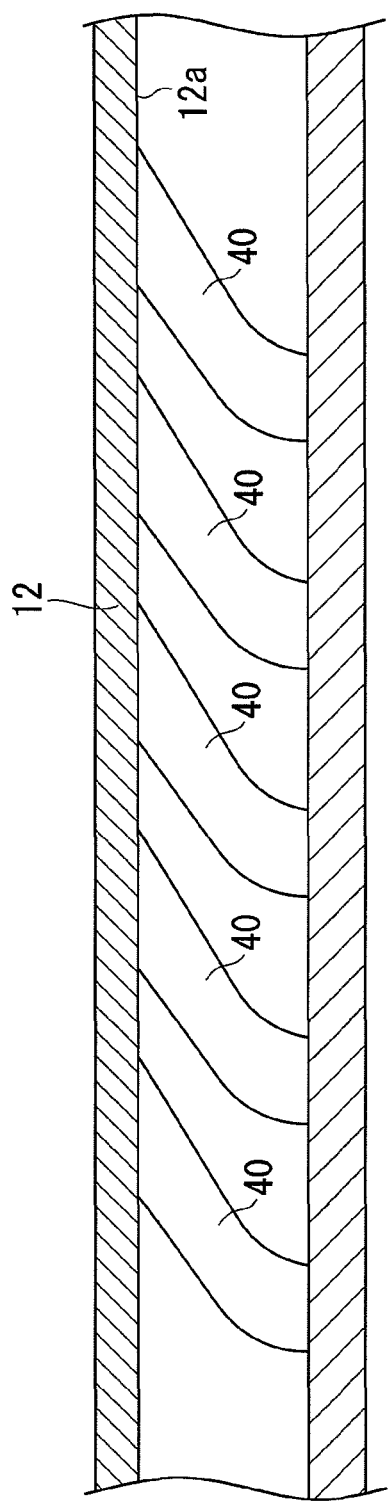
FIG. 19 is a sectional view of a heat exchange bulkhead according to another embodiment of the present invention, in a plane along the longitudinal direction thereof and perpendicular to the surface thereof.

Further, the pin-fin of the present invention is not limited to one whose central axis viewed from an outer side in the width direction is indicated by the straight line 22 (see FIG. 2). For example, a pin-fin 40 that has a shape shown in FIG. 19, specifically, a pin-fin in which only part thereof close to the surface 12a of the shell 12 is inclined backward to the downstream side, or a pin-fin that is inclined in a direction opposite to the pin-fin 40, specifically, a pin-fin in which only part thereof close to the surface 12a of the shell 12 is inclined forward to the upstream side, may be used.

Further, the height H of the pin-fin 21 of the present invention is not limited to four times the radius thereof; it may be set longer or shorter.

Furthermore, the distance between the centers of adjacent pin-fins 21 of the present invention is not limited to four times the radius thereof; it may be set longer or shorter, and it may be set to further increase or decrease the downstream speed.

Furthermore, the arrangement of the pin-fins 21 of the present invention is not limited to the equilateral-triangle arrangement, as shown in FIG. 3; it may be modified in any way to widen or narrow the distance therebetween in the flow direction.

Furthermore, the degree of asperity on the bottom face is not limited to 1 or 2; it may be increased to be more uneven or decreased to be more flat.

Further, in the fourth embodiment, the ribs 32 may be provided on the upstream-side inclined surface 28b, which widens from the apex of the convex portion 28 toward the upstream side, as in the third embodiment.

The invention claimed is:

1. A heat exchange bulkhead structure comprising:
   a base plate provided so as to extend along an inner wall of a shell of a combustor;
   a plurality of pin-fins extending from a surface of the base plate so that the pin-fins are located in a gap between the base plate and the inner wall of the shell; and
   a cooling-medium inlet through which a cooling medium flows into the gap, wherein the cooling medium which flows into the gap through the cooling-medium inlet flows toward an inlet of a turbine along the surface of the base plate,
   wherein a center axis of each of the pin-fins is inclined toward the inlet of the turbine relative to an imaginary line which is perpendicular to the extending direction of a part of the surface of the base member to which said pin-fin is fixed.

2. A heat exchange bulkhead structure according to claim 1, wherein:
the surface of the base plate has a plurality of upstream-side inclined surfaces each of which faces the cooling-medium inlet side and a plurality of downstream-side inclined surfaces each of which faces the turbine inlet side and which is arranged alternately with the upstream-side inclined surfaces; and
each of the pin-fins extends from the downstream-side inclined surface.

3. A heat exchange bulkhead structure comprising:
a base plate provided so as to extend along an inner wall of a shell of a combustor; and
a plurality of pin-fins provided extending from a surface of the base plate so that the pin-fins are located in a gap between the base plate and the inner wall of the shell,
a cooling-medium inlet through which a cooling medium flows into the gap, wherein the cooling medium which flows into the gap through the cooling-medium inlet flows toward an inlet of a turbine along the surface of the base plate, wherein:
a center axis of each of the pin-fins is inclined toward the cooling-medium inlet relative to an imaginary line which is perpendicular to the direction from the cooling-medium inlet toward the inlet of the turbine;
the surface of the base plate has a concave-convex surface having a wave shape in cross section in which a concave portion and a convex portion are alternately formed repeatedly along the direction from the cooling-medium inlet toward the inlet of the turbine; and
each of the pin-fins extends from an upstream-side inclined surface.

4. A heat exchange bulkhead structure according to claim 1, wherein a plurality of turbulence enhancing members that disturb the cooling medium flowing in the vicinity of the surface of the base plate to produce a turbulent flow are provided on the surface of the base plate.

5. A gas turbine combustor comprising a heat exchange bulkhead structure according to claim 1.

6. A gas turbine comprising a gas turbine combustor according to claim 5.

7. A heat exchange bulkhead structure according to claim 2, wherein a plurality of turbulence enhancing members that disturb the cooling medium flowing in the vicinity of the surface of the base plate to produce a turbulent flow are provided on the surface of the base plate.

8. A heat exchange bulkhead structure according to claim 3, wherein a plurality of turbulence enhancing members that disturb the cooling medium flowing in the vicinity of the surface of the base plate to produce a turbulent flow are provided on the surface of the base plate.

9. A gas turbine combustor comprising a heat exchange bulkhead structure according to claim 2.

10. A gas turbine combustor comprising a heat exchange bulkhead structure according to claim 3.

11. A gas turbine combustor comprising a heat exchange bulkhead structure according to claim 4.

12. A gas turbine combustor comprising a heat exchange bulkhead structure according to claim 7.

13. A gas turbine combustor comprising a heat exchange bulkhead structure according to claim 8.

14. A gas turbine comprising a gas turbine combustor according to claim 9.

15. A gas turbine comprising a gas turbine combustor according to claim 10.

16. A gas turbine comprising a gas turbine combustor according to claim 11.

17. A gas turbine comprising a gas turbine combustor according to claim 12.

18. A gas turbine comprising a gas turbine combustor according to claim 13.

* * * * *